United States Patent [19]

Whitcomb

[11] 4,173,212
[45] Nov. 6, 1979

[54] SELF-CONTAINED SOLAR GREENHOUSE

[75] Inventor: Carl E. Whitcomb, Stillwater, Okla.

[73] Assignee: The Board of Regents for the Oklahoma Agricultural and Mechanical Colleges, Stillwater, Okla.

[21] Appl. No.: 842,666

[22] Filed: Oct. 17, 1977

[51] Int. Cl.$^2$ ............................................. F24J 3/02
[52] U.S. Cl. ...................................... 126/430; 47/17
[58] Field of Search ..................... 126/271, 270; 47/17

[56] References Cited

U.S. PATENT DOCUMENTS

| | | | |
|---|---|---|---|
| 3,254,702 | 6/1966 | Thomason | 126/270 X |
| 3,369,541 | 2/1968 | Thomason | 126/271 X |
| 3,412,728 | 11/1968 | Thomason | 126/270 |
| 3,949,732 | 4/1976 | Reines | 126/271 X |
| 4,004,380 | 1/1977 | Kwake | 126/271 X |
| 4,018,213 | 4/1977 | Mann, Jr. | 47/17 X |
| 4,020,989 | 5/1977 | Kautz | 47/17 X |
| 4,054,246 | 10/1977 | Johnson | 126/270 |

FOREIGN PATENT DOCUMENTS 2305122 10/1976 France ....................................... 47/17

OTHER PUBLICATIONS

Hort Science, vol. 12, No. 1, Feb. 1977, pp. 1–2, 14–24.

Primary Examiner—Thomas F. Callaghan
Attorney, Agent, or Firm—Head, Johnson & Chafin

[57] ABSTRACT

A solar heated greenhouse formed with a rectangular floor having parallel sides and ends, a quonset type roof structure supported above the floor, the roof extending to the floor sides, the roof being formed of an inner and an outer spaced apart light penetrating member, the space between the two members providing a heat collecting chamber, water-filled strata beneath the floor, the heat collecting chamber between the roof members communicating with the strata along each side of the floor, means for spraying water in the heat collecting chamber between the light penetrating member so that the water is heated by solar energy and runs down the chamber and into the strata beneath the floor, and means for recycling water from the strata into the heat collecting chamber whereby water in the strata is heated during sunlit hours and the heat of the water in the strata penetrates the floor and maintains a warm temperature within the greenhouse at night and during sunless days.

9 Claims, 3 Drawing Figures

SELF-CONTAINED SOLAR GREENHOUSE

BACKGROUND AND OBJECTS OF THE INVENTION

The use of fuel heated greenhouses for growing plants during winter months has long been practiced. With the impending fuel shortages, it is becoming increasingly important to provide a greenhouse which can be used for growing plants in cold weather but which requires no fuel or, at least, a greatly reduced amount of fuel.

Greenhouses provide an environment in which plants receive sunlight for growth and protection against low temperatures. A greenhouse is a natural solar collector during sunlight hours since sun penetrating the transparent covering heats the air and physical objects within the greenhouse. However, the quantity of heat collected during the day is seldom sufficient to maintain a preselected minimum temperature during night hours or during days when no sunlight occurs so that supplementary heating is required.

The present invention is a greenhouse which performs the dual function of first providing the environment for the growth of plants and second, functions as a solar collector for the storage of heat to maintain the interior of the greenhouse at acceptable temperatures for growing plants during the night and on cloudy days.

It is therefore an object of this invention to provide a solar heated greenhouse.

More particularly, an object of this invention is to provide a greenhouse having a quonset type roof which extends to the floor level on each side of the greenhouse, the roof having an inner and outer light penetratable member providing a heat collecting chamber therebetween and including means of dispersing water in the heat collecting chamber and storing the heated water in a strata beneath the floor to heat the greenhouse at night and on sunless days.

These general objects as well as other and more specific objects of the invention will be fulfilled in the following description and claims, taken in conjunction with the attached views.

SUMMARY OF THE INVENTION

A solar greenhouse is described having a floor with parallel sides. A quonset type structure is supported above the floor, the roof of the structure extending to the floor sides. The roof is formed of at least two spaced apart light penetratable members, such as plastic, providing a heat collecting chamber between the two members. A water filled strata is provided beneath the floor surface. At the sides of the floor the heat collecting chamber between the two roof members communicates with the under floor water filled strata. Spraying hoses are positioned in the roof structure above the lowermost member and below the next adjacent one, that is, within the heat collecting chamber. A pump is used for circulating water from the strata through the hoses into the heat collecting chamber wherein the water is heated by sunlight during sunny hours, the water flowing down the roof heat collecting chamber and into the strata beneath the floor so that on sunlit days, the solar energy is utilized to heat the water stored in the strata beneath the floor. At night and sunless days, the water is not circulated, but the heat of the water in the strata beneath the floor radiates through the floor to keep the interior of the structure warm enough for the plants within the greenhouse without the use of fuel consuming heat.

DETAILED DESCRIPTION OF THE PREFERRED EMBODIMENT

Figure 1:
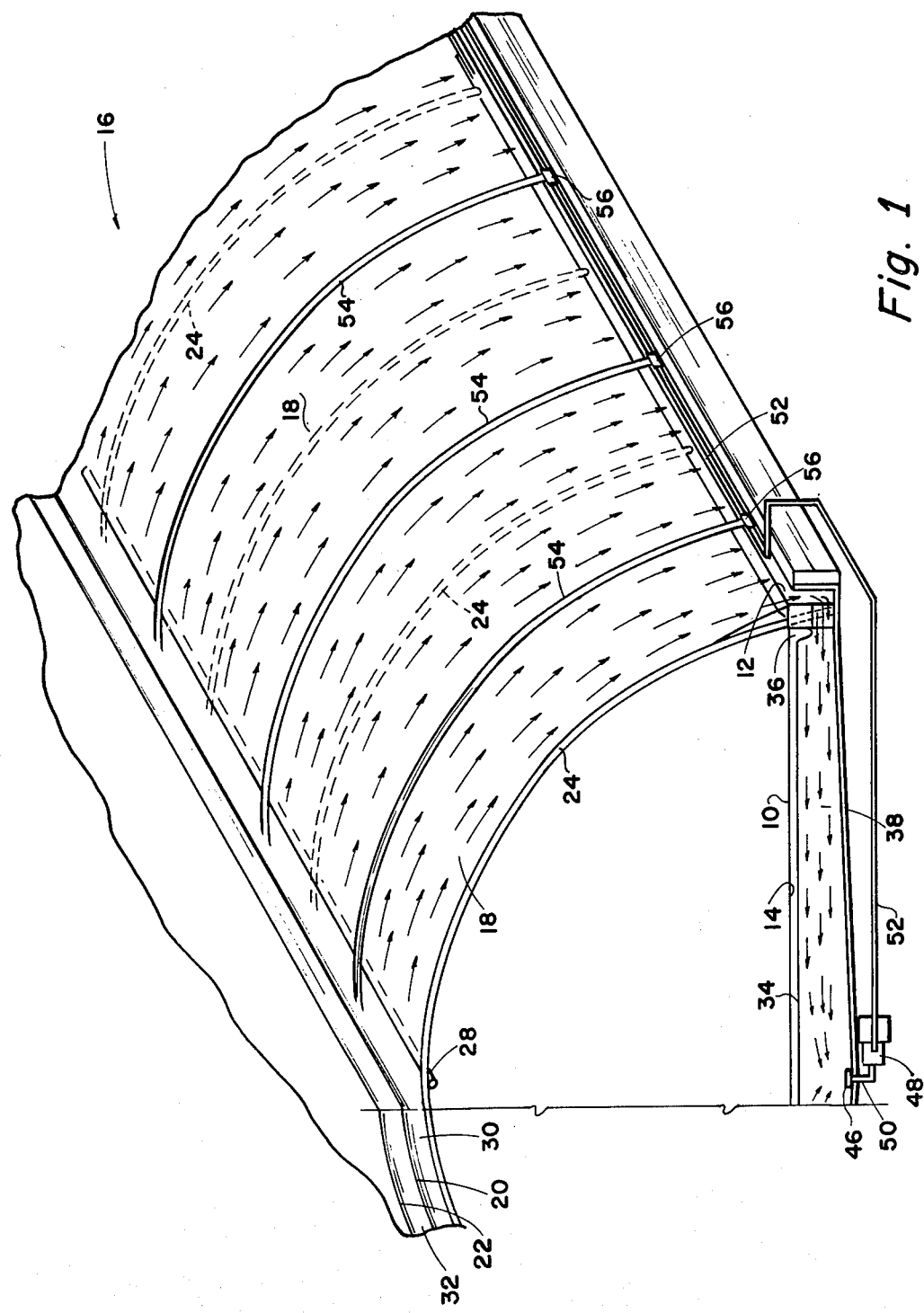
FIG. 1 is a partial isometric view of one half of a greenhouse employing the principles of this invention.
Figure 3:
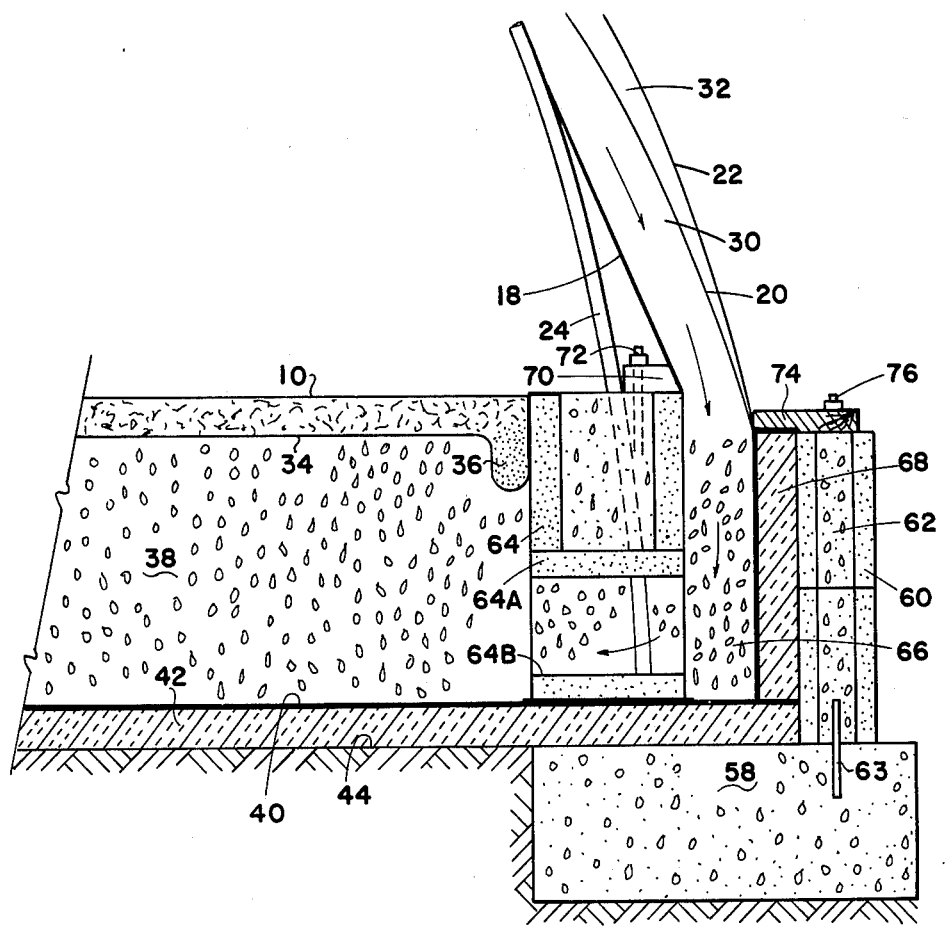
FIG. 3 is an enlarged cross-sectional view of a portion of a greenhouse constructed according to this invention showing particularly the foundation wall and water filled strata in which heated water is stored.

Referring to the drawings and first to FIG. 1, an isometric view shown partially cut away discloses the basic concepts of the greenhouse of this invention. The greenhouse has a rectangular floor 10, the floor having parallel sides 12 and parallel ends 14, only one side and one end being illustrated in FIG. 1. Supported above floor 10 is a quonset type roof structure generally indicated by numeral 16. The roof 16 includes at least two light penetratable members. Referring to FIG. 3, the lowermost light penetratable member is indicated by the numeral 18; an intermediate light penetratable member by numeral 20; and an uppermost light penetratable member by numeral 22. It is understood that in practice of the invention only two members 18 and 20 are required, however, the use of three spaced apart members 18, 20, and 22 provides improved results as will be described in more detail subsequently.

While the roof may be supported in a variety of ways, the illustrated and an economical and successful arrangement, includes the use of arcuate ribs 24 which are spaced apart and parallel to each other and extend from one floor side 12 to the other floor side. To maintain the ribs in proper orientation, a center cross tie member 28 (see FIG. 2) may be affixed to the lower surface at the upper mid point of the ribs.

The lower light penetratable member 18 and the intermediate light penetratable member 20 are spaced apart from each other and provide a heat collecting chamber 30 therebetween. When a third member 22 is employed, it is spaced apart from intermediate member 20 and provides an insulating chamber 32. The method of spacing the members 18, 20, and 22 apart may include spacers (not shown) or they may be held apart by means of air pressure using techniques well known in the greenhouse technology.

Floor 10 may be formed of concrete, crushed limestone, or the like. Beneath floor 10 is a water barrier 34 which may be in the form of sheet plastic. Adjacent the floor sides 12 the water barrier 34 is formed, as best illustrated in FIG. 3, to provide a water trough 36 filled with sand or aggregate which permits water to flow therethrough. The water trough 36 formed adjacent each floor sides 12 communicate to a water collection area (not shown) by which water may be collected and removed from the greenhouse.

Figure 2:
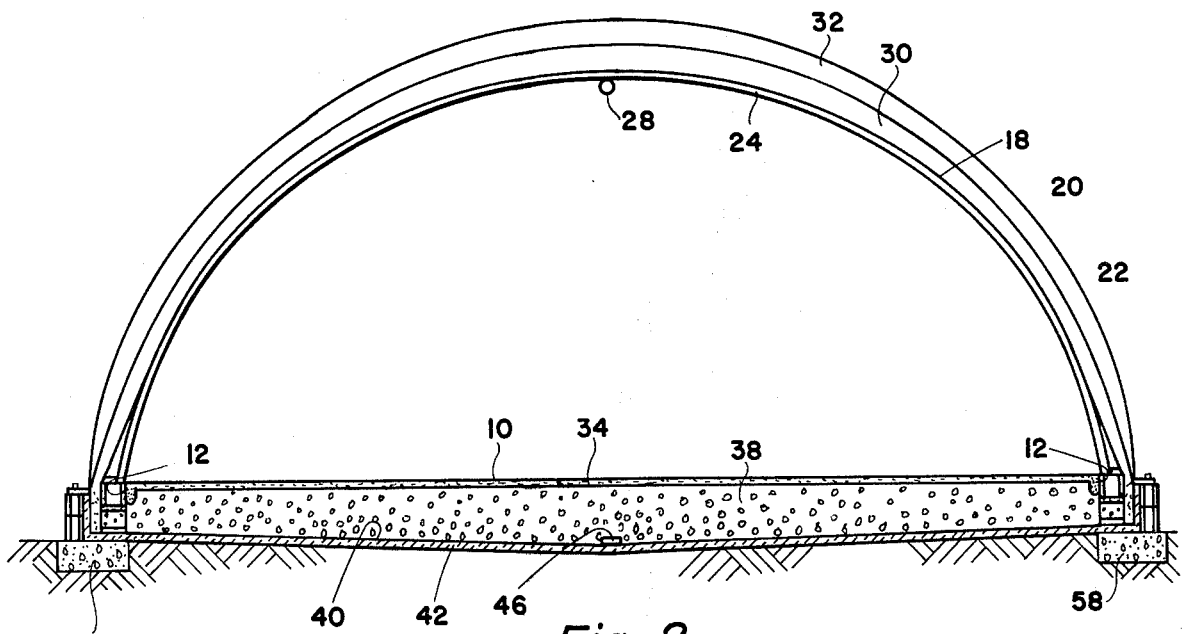
FIG. 2 is a cross-sectional view of a greenhouse of the type as shown in FIG. 1.

Positioned beneath the floor water barrier 34 is a water filled strata 38. This strata is preferably formed of broken rock, crushed limestone, or any material which provides structural support for the floor 10 and, at the same time, permits the free flow of water therethrough. Beneath the water filled strata 38 is an impervious member 40, such as sheet plastic, which prevents water from leaking out of the strata 38. In addition, a preferred arrangement includes the use of a layer of insulation 42, such as styrofoam, interposed between the impervious member 40 and the earth 44 to prevent heat from escaping from the strata 38 into the earth. The lower surface of the water filled strata 38, where impervious member 40 is positioned, is tapered from the floor sides 12 towards the middle, as shown in FIG. 2. At the middle a perforated collection pipe 46 extends the length of the floor. As shown in FIG. 1, a pump 48 has an inlet 50 connected to the collection pipe 46 and distributes water from the water-filled strata 38 through outlet pipe 52.

Positioned at spaced intervals within the heat collecting chamber 30 between lowermost light penetratable member 18 and intermediate member 20 are spaced apart perforated hoses 54. The ends of the hoses 54 are connected by T fitting 56 to outlet pipe 52. When pump 48 is energized, water is picked up from strata 38 and pumped through outlet pipe 52 and the T fittings 56 into the perforated hoses 54. The water is sprayed from the hoses and drained down within the heat collecting chamber 30. During sunlight hours the water is warmed. The warmed water flows, as shown in FIG. 3, and as indicated by the arrows, from the chamber 30 into the water filled strata 38.

FIG. 3 illustrates one means of forming the foundation and support walls of the greenhouse. A foundation base 58 of concrete is poured below the surface of the earth 44. Positioned on the base 58 is an outer upstanding foundation structure 60 which may be made of concrete block, the cores of which are filled with concrete 62. A steel pin 63 may be used to secure the outer foundation structure 60 to the foundation base 58.

Insulation 42 preferably extends over the top of the foundation base 58 within outer foundation wall 60. Placed on insulation 42 above base 58 is an upstanding inner foundation wall 64 which may also be made of concrete blocks having hollow interiors. The lowermost block 64A is turned on its side so that the openings 64B therein permits the passage of water into the water filled strata 38. The upper block of inner wall 64 may be filled with concrete.

The outer wall 60 and inner wall 64 are spaced apart providing a channel 66 therebetween which is preferably filled with crushed rocks or aggregate to permit free passage of water from the heat collecting chamber 30 into water filled strata 38. To further prevent heat loss vertical insulation 68 is provided between channel 66 and outer side wall structure 60. The lower light penetratable member 18 is attached to the upper end of the inner foundational structure 64, such as by means of a wood runner 70 held to the inner wall 64 by means of a bolt and nut 72. In like manner, the intermediate light penetratable member 20 and outer light penetratable member 22 are held to the outer foundation structure 60 by means of a wood runner 74 held in place by a bolt and nut 76.

The details of construction shown herein are for purposes of exemplifying the ease and simplicity by which the general concepts of the invention may be practiced.

METHOD OF OPERATION

During a sunny day the energy of the sun will heat the collecting chamber 30 to an elevated temperature. It is not important how high this temperature is as long as it is above the temperature of the water in strata 38. With pump 48 energized, water from the strata flows through outlet pipes 52 and to distribution hoses 54. Water is sprayed as a mist from hoses 54; and as it flows gradually down the outer surface of lower light penetratable member 18 it is heated by the sun. The water flows into channel 66 and through opening 64b in the inner foundation structure, and into strata 38. This procedure is maintained as long as solar energy provides a warmer temperature within the collection chamber 30 than the water in strata 38. When the sun is obscured by cloudiness, and at night, the pump 48 is deenergized and no water is circulated.

When the temperature outside the structure falls there will be a corresponding tendency for the temperature within the structure also to fall. However, the reservoir of heat contained in water filled strata 38 maintains the floor at a warm temperature. The warmed floor, both by radiation and conduction, warms the interior of the greenhouse. This warmth takes place without the requirement of any energy for generation or distribution of heat. To further insure the usefulness of the heat from floor 38, containers for growing plants may be placed directly on the floor 10 of the greenhouse. Thus, the only energy required for the greenhouse is that which is utilized to drive pump 48 during periods when solar energy is being transformed and stored in the form of the heat retained in the water filled strata 38. This heat is stored both in the water within the strata and the rocks, gravel, or other porous structural material utilized within the strata 38 to support floor 10.

It should be noted that an important feature of the invention is that the water utilized to collect and store energy is isolated from the interior of the greenhouse itself. That is, any water which falls upon the floor 10 is prevented from co-mingling with the water in strata 38 by the impervious layer 34. This prevents the contamination of the water used for temperature control by chemicals within the greenhouse and reduces the possibility of algae formation within the strata 38 and on the lower light penetratable member 18. It has been learned by experimental usage of the invention that the water sprayed into the heat collecting chamber 30 does not significantly reduce the amount of light passing on to plants within the greenhouse.

The light penetratable members 18, 20 and 22 are preferably formed of plastic sheets, such as polyethylene plastic. By "light-penetratable member," the expression means a member which is either light transparent or opaque and which permits sufficient light transfer to augment the growth of plants within the greenhouse. As previously indicated, only two layers, that is, 18 and 20, of the light penetratable members are required to practice the invention. However, it has been learned that the use of the third layer 22 increases the efficiency of the heat collecting system by providing insulation space 32. The insulating space 32 serves not only to help maintain a higher temperature within heat collecting chamber 30 on sunny days especially when wind is blowing, but also forms additional insulation against the loss of heat from the greenhouse at night or on cloudy days.

It can be seen that the invention described herein eliminates the use of outside or supplemental storage tanks. If additional heat storage is required for more northern climates, the depth of the water filled strata 38 can be increased. In addition, heat can be stored in advance of winter months by beginning operation of the system early in the fall.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification but is to be limited only by the scope of the attached claim or claims, including the full range of equivalency to which each element thereof is entitled.

What is claimed is:

1. A solar heated greenhouse comprising;
    a floor having parallel sides;
    a quonset type roof structure supported above said floor, the roof extending to the floor sides, the roof being formed of inner and outer spaced apart light penetratable members providing a heat collecting chamber therebetween;
    a water filled strata beneath said floor and in heat conductive relationship therewith, the strata having communication with said roof heat collecting chamber at the floor edges, the strata having a base surface, the longitudinal median portion of said base surface being at a lower level than the longitudinal edges of said lower base;
    an impervious lining provided between said lower base and the earth;
    means for spraying water in said heat collecting chamber between said light penetratable members whereby water heated by solar energy runs down the chamber and into said strata;
    pump means for circulating water from said strata into said heat collecting chamber whereby water in said strata is heated during sunlit hours, the heat of the water in the strata penetrating said floor and maintaining a warm temperature within the greenhouse at night and during cloudy days, said pump means comprising a pump having an inlet and outlet, pipe means connected between said pump inlet and the longitudinal median portion of said lower base, a distribution conduit connected to said pump outlet and extending along at least one side of said floor, and a plurality of hoses each having spaced openings therein, the hoses being positioned in spaced apart orientation in said heat roof collecting chamber, each said hose being connected to said distribution conduit; and
    the water filled strata and said heat collecting chamber together with said pump means forming a closed system.

2. A solar heated greenhouse according to claim 1 wherein said roof structure is formed of three light penetratable members spaced apart from each other, said heat collecting chamber being between the lowermost and intermediate members.

3. A solar heated greenhouse according to claim 1 wherein said light penetratable members are of transparent or opaque flexible plastic material.

4. A solar heated greenhouse according to claim 1 including an impervious membrane between said floor and said strata.

5. A solar heated greenhouse according to claim 1 including insulation means below said water filled strata.

6. A solar heated greenhouse according to claim 1 wherein the bottom of said water filled strata slopes toward the center to facilitate the collection of water therefrom.

7. A solar heated greenhouse according to claim 1 including a foundation structure comprising:
    a concrete base positioned in the earth;
    an outer upstanding foundation structure supported on said base having means at the top thereof for securing the lower edge of said outer light penetratable member;
    an inner upstanding foundation structure supported on said base and spaced from said first foundation structure providing a channel therebetween, the inner foundation structure having means at the top thereof for securing the lower edge of said inner light penetratable member, said inner foundation structure having openings therein providing communication between said water filled strata and said channel whereby water passing from said heat collecting chamber flows into said channel and into said strata.

8. A solar heated greenhouse according to claim 7 including:
    insulation means positioned between said strata and the earth therebetween, the insulation extending between said base and said inner foundation structure; and
    insulation between said outer foundation structure and said channel, such insulation joining said first-mentioned insulation whereby said water filled strata has insulation at the bottom and around the sides thereof.

9. A solar heated greenhouse according to claim 7 wherein said strata is of gravel, water filling the interstices, and wherein a flexible impervious membrane is positioned between said strata and said floor, and wherein said impervious membrane is configured to form a channel around said floor, said channel being filled with a permeable material forming a drain for water from the floor surface.

* * * * *